May 5, 1959 E. L. KIRGAN 2,885,670

REFLECTOR TARGET

Filed Aug. 8, 1957 2 Sheets-Sheet 1

INVENTOR

EDWARD L. KIRGAN

BY Raymond W. Colton

ATTORNEY

May 5, 1959 E. L. KIRGAN 2,885,670

REFLECTOR TARGET

Filed Aug. 8, 1957 2 Sheets-Sheet 2

*INVENTOR*

EDWARD L. KIRGAN

*BY* Raymond W. Colton

*ATTORNEY*

United States Patent Office 2,885,670

Patented May 5, 1959

2,885,670

REFLECTOR TARGET

Edward L. Kirgan, Baltimore, Md., assignor to Elk Enterprises, Inc., a corporation of Maryland Application August 8, 1957, Serial No. 677,035

7 Claims. (Cl. 343—18)

This invention relates to a collapsible target particularly intended for use with radar equipment for locating objects at sea or even on land.

The invention is in the general category of the disclosure of the patent to Leonard, No. 2,778,010, dated January 15, 1957. It constitutes an improvement over the Leonard disclosure however, in that it requires fewer parts and because of the expeditious manner in which it can be extended from its collapsed condition to its operative condition under the force of gravity.

It is among the objects of this invention to provide a collapsible target comprising three substantially equal square members hinged together along their diagonals, each member having opposed reflective surfaces, one of the members being composite, each of the others of the members being unitary, the target having an extended condition wherein the reflective surfaces of each of the members are disposed at right angles to the reflective surfaces of each of the others of the members, the target having a collapsed condition wherein the reflective surfaces of the members are superimposed in substantially parallel relationship, and a cable connected to a first point on one of the members spaced from a diagonal of the target in collapsed condition and threaded through an eye carried by another of the members at a second point nearer the diagonal, whereby the target becomes extended under the force of gravity upon its suspension in collapsed condition by the cable.

The composite member preferably comprises two substantially triangular panels secured in spaced relationship to define a slot having a width exceeding the thickness of one of the unitary members, the panels being parallel and offset a distance substantially equal to the thickness of one of the unitary members.

One of the unitary members preferably comprises four quadrants having surfaces lying in parallel planes, two of the quadrants being coplanar, a third of the quadrants being displaced from the coplanar quadrants a distance substantially equal to the thickness of the other of the unitary members, and the fourth of the quadrants being displaced from the coplanar quadrants a distance substantially equal to twice the thickness of the other of the unitary members. Such a unitary member preferably contains a diagonal slot separating the coplanar quadrants and containing diagonal slots partially separating the third and fourth quadrants from the coplanar quadrants.

One of the unitary members preferably contains a diagonal slot extending from a corner thereof to substantially its center. Such a unitary member may contain a notch at a corner thereof for limiting relative movement of the members in extended condition, and two such notches may be provided at diagonally opposite corners for this purpose.

A more complete understanding of the invention will follow a description of the accompanying drawings wherein.

Figures 3, 5, 6, 7, 8, 9, 10, 12, 13:
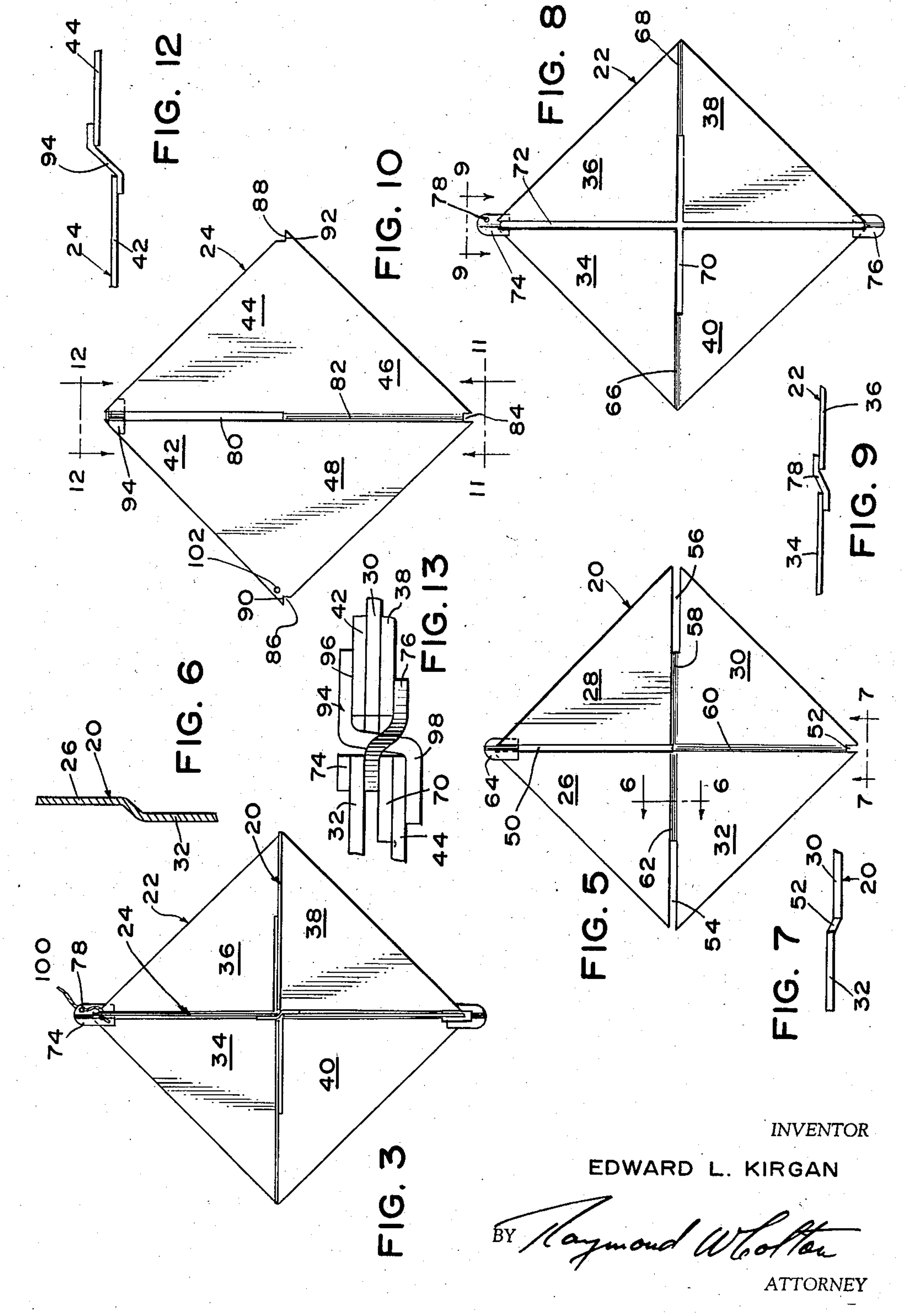
Fig. 3 is an elevation of the target in its fully extended condition.
Fig. 5 is a plan view of one of the unitary members from which the target is constructed.
Fig. 6 is a fragmentary section taken along line 6—6 of Fig. 5.
Fig. 7 is a fragmentary elevation taken along line 7—7 of Fig. 5.
Fig. 8 is a plan view of a composite member used in constructing the target.
Fig. 9 is a fragmentary elevation taken along line 9—9 of Fig. 8.
Fig. 10 is a plan view of another of the unitary members from which the target is constructed.
Fig. 12 is a fragmentary elevation taken along line 12—12 of Fig. 10.
Fig. 13 is a fragmentary elevation taken along line 13—13 of Fig. 1.

The collapsible target shown in the drawings includes three substantially equal square members including a unitary member 20 shown in Fig. 5, a composite member 22 shown in Fig. 8 and a unitary member 24 shown in Fig. 10. To facilitate an understanding of the construction of the target, the quadrants defined by the diagonals of each of the members 20, 22 and 24 have been individually designated by reference characters. Thus the member 20 comprises quadrants 26, 28, 30 and 32. The composite member 22 comprises quadrants 34, 36, 38 and 40. Similarly, the member 24 comprises quadrants 42, 44, 46 and 48.

The quadrants 26 and 28 of the member 20 are coplanar and spaced by means of a slot 50 extending from the upper corner as depicted in Fig. 5, to approximately the center of the member, the slot having a width slightly greater that the thickness of a member to be received in this slot. At its lower corner as depicted in Fig. 5, the member 20 contains a short slot or notch 52 in alignment with the slot 50. Along its diagonal disposed at 90° to the slot 50, the member 20 contains slots 54 and 56 extending from opposed corners towards the center of the member a distance approximately half way between each corner and the center. The member 20 contains a step 58 between its quadrants 28 and 30 whereby the quadrant 30 is displaced towards the observer as viewed in Fig. 5, a distance approximating the thickness of one of the other members constituting the target. The member 20 contains another step 60 between the quadrants 30 and 32 whereby the quadrant 32 is nearer the observer as viewed in Fig. 5, a distance from the quadrant 30 approximating the thickness of the material constituting another of the members. Accordingly, the step 62 intermediate the quadrants 26 and 32 displaces these quadrants a distance approximating the thicknesses of two of the other members from which the target is constructed. This offset relationship of the quadrants 26 and 32 is clearly depicted in Fig. 6. Similarly, the offset relationship between the quadrants 30 and 32 is shown in Fig. 7. A connector 64 is shown at the upper corner of Fig. 5 bridging the quadrants 26 and 28 in a position that it will assume during final assembly of the target. The connector 64 is not attached to the corners of these quadrants however, until such time as the three members constituting the target have been assembled. At such time it can be secured to the corners of the quadrants 26 and 28 by riveting, welding or any other appropriate method.

The quadrants 38 and 40 of the member 22 shown in Fig. 8, are coplanar, lying below the coplanar quadrants 34 and 36 by virtue of steps 66 and 68 lying along the horizontal diagonal of this figure. These steps 66 and 68 extend from opposite corners of the member about half the distance towards the center thereof. Extending from the proximate portions of these steps, the horizontal diagonal is provided with a slot 70. This composite member 22 is made up of two panels, one of which is composed of quadrants 36 and 38 and the other of which is composed of quadrants 34 and 40. These two panels are separated by a gap 72 which is somewhat wider than the thickness of the other member to be received therein, the two panels being maintained in such spaced relationship by means of connectors 74 and 76 depicted in the positions that they will assume in final assembly, it being understood that these connectors will be attached during final assembly as discussed with reference to connector 64, in such appropriate manner as may be desired. The upper connector 74 contains an opening or eye 78 through which a cable will be threaded in a manner to be described.

The member 24 depicted in Fig. 10 includes coplanar quadrants 42 and 48 separated from quadrants 44 and 46 respectively, by means of a slot 80 extending from the upper corner of the member as depicted in Fig. 10, to approximately its center and a step 82 extending downwardly towards the lower corner of the member. At the extreme lower corner the member is provided with a vertical slot or notch 84 aligned with the slot 80, these slots each having a width somewhat greater than the thickness of the member to be received thereby. At its horizontal corners as viewed in Fig. 10, the member 24 is provided with notches 86 and 88 to provide shoulders 90 and 92 respectively, to limit relative movement of the members to that intended in their extended condition. The upper corners of the quadrants 42 and 44 as viewed in Fig. 10, in their final assembled relationship, will be secured by a connector 94, which as depicted in Fig. 12 will displace these quadrants by a distance corresponding to the thicknesses of two of the members constituting the target. Thus, the connector 94, as shown in Figs. 12 and 13, of Z-shape in cross section, has its flanges 96 and 98 displaced by a distance corresponding to four thicknesses of material constituting the target members. Preferably, the several members are composed of material of uniform thickness.

In assembly, the slot 50 of the member 20 receives the step 82 of the member 24 and the slot 80 of the member 24 receives the step 60 of the member 20. Then the steps 58 and 62 of the member 20 will be received by the slots 70 of the member 22 and the steps 66 and 68 will be received respectively, by the slots 54 and 56 of the member 20. With the principal parts of the target thus assembled, the various connectors 64, 76, 78 and 94 will be secured in their respective positions by means of rivets, welding or otherwise. In its collapsed or compacted condition for shipping or storage, the target will assume the form depicted by Figs. 1 and 13 wherein a cable 100 threaded through the eye 78 of the connector 74 has one end passed through a perforation 102 in the member 24 and knotted, its other end being secured to a ring 104. When it is desired to utilize the target, it is merely necessary to grasp the ring end of the cable 100 whereupon the weight of the target suspended therefrom will produce a turning motion of the member 24 relative to the member 22 causing the member 24 to move from the position depicted in Fig. 1 to the position depicted in Fig. 2, under which conditions the planes of the quadrants carried by the member 24 will be at right angles to the planes of the quadrants formed on the other two members, but the planes of the quadrants of members 20 and 22 will still be parallel and in contact. Continued movement of the members relatively under the force of gravity will occur however, until the knot in the end of the cable 100 is brought as close to the eye 78 as possible to a condition such as that shown in Fig. 3.

Figures 1, 2, 4, 11:
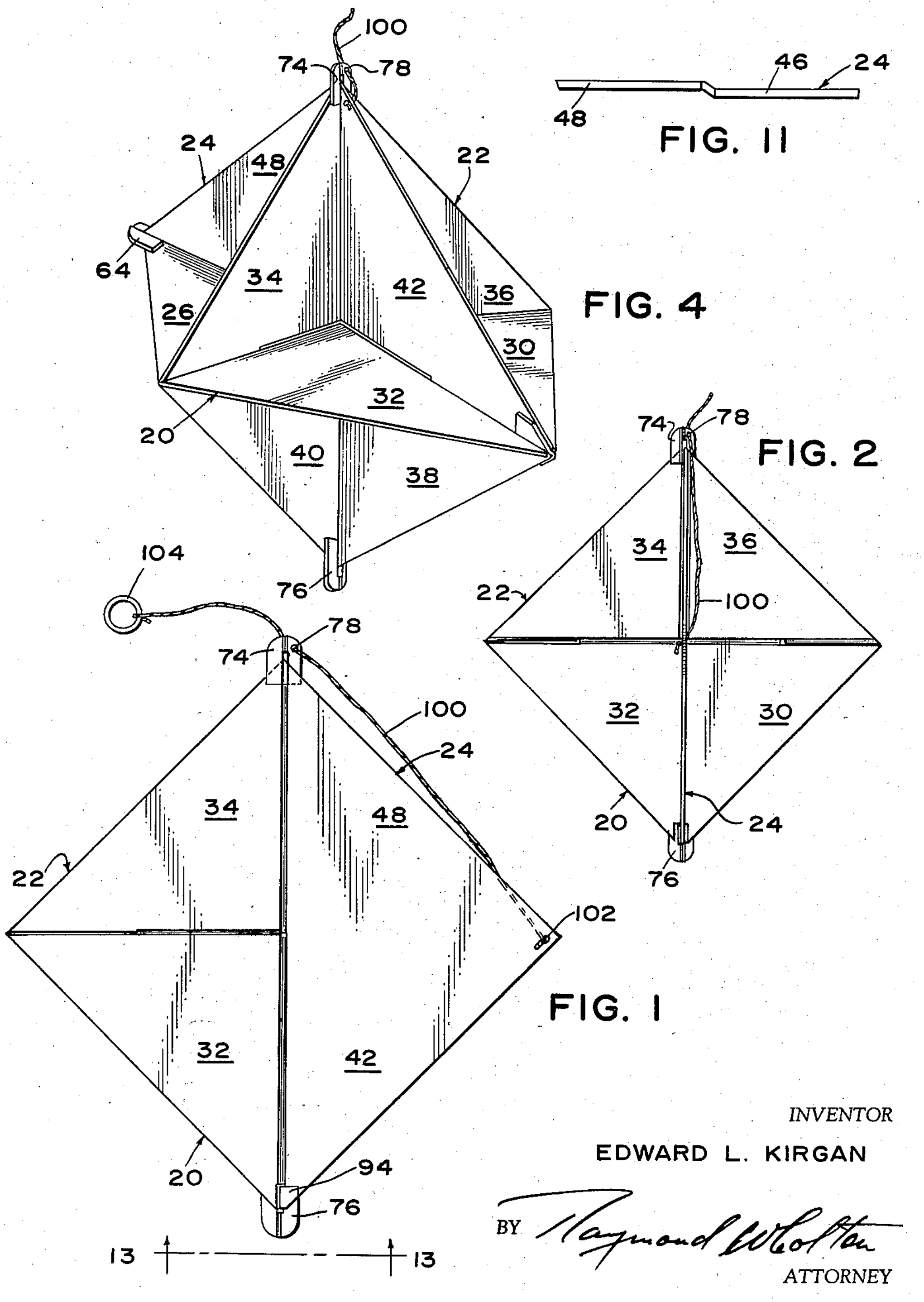
Fig. 1 is an elevation of the collapsible target in collapsed condition.
Fig. 2 is an elevation on a slightly smaller scale of the target in partially extended condition.
Fig. 4 is a perspective view of the target in its fully extended condition.
Fig. 11 is a fragmentary elevation taken along line 11—11 of Fig. 10.

This condition is more clearly depicted in the perspective shown in Fig. 4 in which condition the quadrants of each member will lie at right angles to the quadrants of each of the others of the members to produce an ideal target.

The conversion of the target from its collapsed condition to its extended condition is amazingly simple and rapid, resulting from the mere suspension of the device from its cable.

Whereas only one specific form of the invention has been described and shown in the drawings, such variations are contemplated as fall within the scope of the appended claims.

I claim:

1. A collapsible target comprising three substantially equal square members hinged together along their diagonals, each member having opposed reflective surfaces, one of said members being composite, each of the others of said members being unitary, said target having an extended condition wherein the reflective surfaces of each of said members are disposed at right angles to the reflective surfaces of each of the others of said members, said target having a collapsed condition wherein the reflective surfaces of said members are superimposed in substantially parallel relationship, and a cable connected to a first point on one of said members spaced from a diagonal of said target in collapsed condition and threaded through an eye carried by another of said members at a second point nearer said diagonal, whereby said target becomes extended under the force of gravity upon its suspension in collapsed condition by said cable.

2. A collapsible target as set forth in claim 1 wherein said composite member comprises two substantially triangular panels secured in spaced relationship to define a slot having a width exceeding the thickness of one of said unitary members.

3. A collapsible target as set forth in claim 2 wherein said panels are parallel and offset a distance substantially equal to the thickness of one of said unitary members.

4. A collapsible target as set forth in claim 1 wherein one of said unitary members comprises four quadrants having surfaces lying in parallel planes, two of said quadrants being coplanar, a third quadrant being displaced from said coplanar quadrants a distance substantially equal to the thickness of the other of said unitary members, and the fourth of said quadrants being displaced from said coplanar quadrants a distance substantially equal to twice the thickness of the other of said unitary members.

5. A collapsible target as set forth in claim 4 wherein said one unitary member contains a diagonal slot separating said coplanar quadrants and containing diagonal slots partially separating said third and fourth quadrants from said coplanar quadrants.

6. A collapsible target as set forth in claim 1 wherein one of said unitary members contains a diagonal slot extending from a corner thereof to substantially its center.

7. A collapsible target as set forth in claim 6 wherein said one unitary member contains a notch at a corner thereof for limiting relative movement of said members in extended condition.

References Cited in the file of this patent

UNITED STATES PATENTS

| | | |
|---|---|---|
| 2,498,660 | Dunmore et al. | Feb. 28, 1950 |
| 2,778,010 | Leonard | Jan. 15, 1957 |

FOREIGN PATENTS

| | | |
|---|---|---|
| 718,516 | Great Britain | Nov. 17, 1954 |